April 7, 1942.  C. A. BROWN  2,278,421
VALVE DEVICE
Filed July 8, 1939
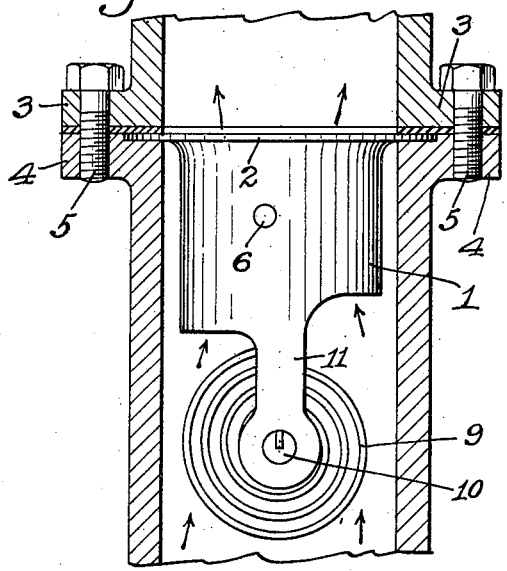
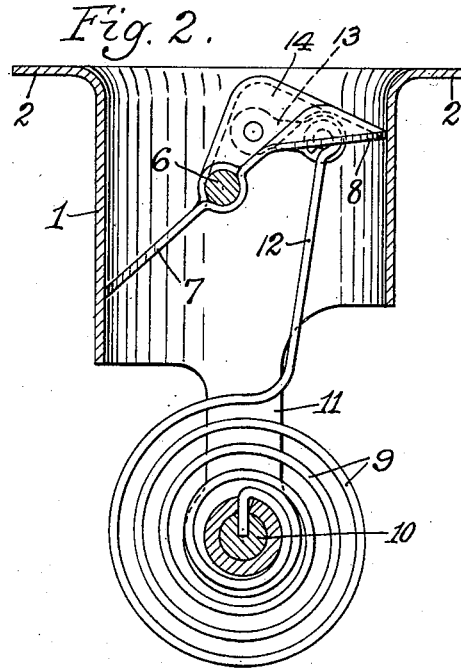
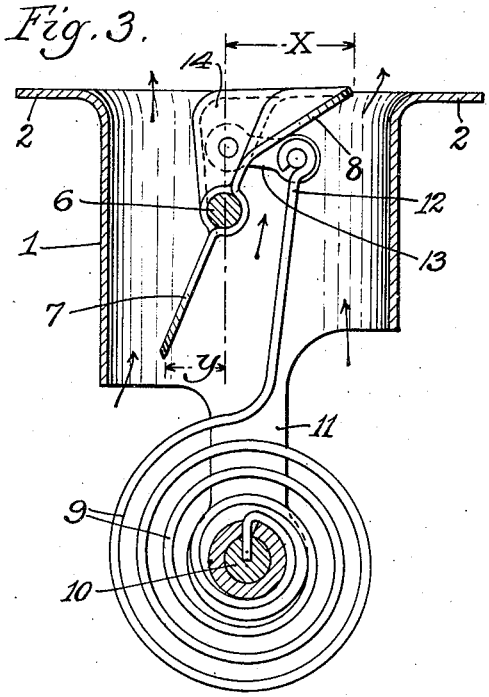
Inventor
Clyde A. Brown
by Parker & Carter
Attorneys.

Patented Apr. 7, 1942

2,278,421

UNITED STATES PATENT OFFICE 2,278,421

VALVE DEVICE

Clyde A. Brown, Chicago, Ill., assignor to The Dole Valve Company, Chicago, Ill., a corporation of Illinois Application July 8, 1939, Serial No. 283,426

8 Claims. (Cl. 236—34)

This invention relates to valve devices and has for its object to provide a new and improved device of this description.

The invention has as a further object to provide a butterfly valve which shall be balanced when in its closed position, that is just before it starts to open, and that shall become unbalanced while it is opening, the unbalanced condition increasing as the valve opens, such unbalanced condition acting to cause the water passing through the valve to assist in its opening.

The invention has as a further object to provide a butterfly valve which is connected with a thermostat so that when the temperature rises a predetermined amount, the thermostat starts to open the valve, the valve being so constructed that during its opening movement it becomes unbalanced, so that the water passing through the passageway controlled by the valve acts to assist the thermostat to move the valve to its fully open position.

The invention has as a further object to provide a pivotally mounted butterfly valve wherein the effective pressure area on each side of the pivot is substantially the same when the valve is closed and where the effective pressure area on one side of the pivot decreases to a greater extent than on the other side of the pivot as the valve is opened, thereby causing unbalancing of the valve and utilizing the pressure of the water to help the thermostat to open the valve.

The invention has further objects which are more particularly pointed out in the accompanying description.

Referring now to the drawing, Fig. 1 is a view showing one form of device embodying the invention;

Fig. 2 is a sectional view through the casing of the device illustrated in Fig. 1, showing the valve closed; and Fig. 3 is a view similar to Fig. 2, showing the valve partially open.

Like numerals refer to like parts throughout the several figures.

For purposes of illustration I have shown the valve device in position in a passageway which is to be controlled thereby. In this construction the valve device is provided with a casing 1. Any suitable means is provided for holding the valve device in position in a passageway. As herein shown, this result is secured by providing the casing 1 with a flange 2. This flange is held in position between the members 3 and 4 by means of the fastening devices 5. Within the casing 1 is a butterfly valve mounted upon a pivot 6 which pivot is mounted in the casing 1. It is of course evident that the pivot itself may turn in the casing, or the valve may turn on the pivot. This valve is provided with a part 7 on one side of the pivot and a part 8 on the other side of the pivot.

The part 7 in the construction shown in Figs. 2 and 3 is substantially straight and the part 8 is bent or deformed so as to be out of alignment with the part 7. The bend may be a straight bend or a curved bend as desired, the important feature being that the valve on one side of the pivot must be so shaped as to deflect the water striking it when it is partially opened more or less abruptly, so as to utilize the flow or dynamic pressure of the water to assist in opening the valve, or it must be so shaped as to project into the flowing water stream a greater distance than the side of the valve on the other side of the pivot, while the valve is moving to its open position.

In the particular construction shown there is a thermostat 9 which has one end connected to a shaft 10 fixed to the members 11 of the casing. The other end 12 of the thermostat is connected to the valve at one side of the pivot. Any suitable connection may be provided. As herein shown, this connection is made by a link 13 which is pivoted to the end 12 and is also pivoted to the valve. The valve is preferably provided with an indented portion 14 into which the end of the link 13 projects.

When the valve is in its closed position, as indicated in Fig. 2, the valve is substantially balanced. While the pivot 6 is at one side of the center of the conduit, the shape of the valve is such that the effective areas on both sides of the pivot are equal. In this position, since flow is not a factor and static pressure alone determines the balance, the valve is substantially balanced. The water when the valve is in this position is in a static condition and simply exerts a static pressure, which is a substantially balanced pressure, on each side of the pivot, so that it does not cause the valve to open. After the valve starts its opening movement it becomes unbalanced and the unbalanced condition increases as the valve moves to its fully open position. There are two reasons for this unbalancing of the valve, which are as follows. As shown in Fig. 3, it will be seen that due to the bent end 8, this end of the valve projects farther across from the center of the pivot toward the periphery, indicated at X, than does the straight end 7, indicated at Y. The bent end 8 therefore provides a greater pressure area for the water which is flowing in the direction of the arrow, than does the straight end 7, and hence there is a greater pressure area, the valve is unbalanced, and the pressure of the water tends to assist the thermostat in opening the valve. There is another reason making the valve unbalanced, and that is the water as it flows, strikes the bent end 8 and must be deflected, that is, its course changed. This produces a flow or dynamic pressure on the bent end 8 which is greater than that on the straight end 7, as the water slides off of the straight end 7, but is more or less abruptly deflected from the bent end 8.

In this construction as the downstream force exerts itself on the underside of the bent end of the valve member and the thermostat calls for a greater opening, a low pressure effect or low pressure area is formed on the upstream side on the top of the lower end of the valve and this low pressure effect tends to decrease as the lower end of the valve assumes a vertical or opening position. In the meantime, a low pressure area or a low pressure effect is obtained on the top side of the upper bent end of the valve and this effect also tends to decrease as the valve assumes a vertical or opening position, but at a lesser rate than that at the lower end of the valve. The horizontal projection of the deformed portion of the valve on the downstream side of the pivot is wider than the horizontal projection of the other portion of the valve on the upstream side of the pivot. The effective areas on opposite sides of the valve pivot are substantially equal when the valve is closed so that the valve is substantially balanced when closed.

I claim:

1. A valve device comprising a casing, a valve eccentrically pivotally mounted in said casing, the portion of the valve on one side of the pivot being deformed, so as to deflect the water striking it as the valve is opened, so as to utilize the flow pressure of the water to assist in opening the valve, the effective areas on opposite sides of the valve pivot being substantially equal when the valve is closed, so that the valve is substantially balanced when closed, and a thermostat connected with said valve to start the opening movement of the valve under predetermined conditions.

2. A valve device comprising a casing, a valve eccentrically pivotally mounted in said casing and substantially balanced in its closed position, a thermostat connected with said valve so as to start its opening movement under predetermined conditions, the portion of the valve on the downstream side of the pivot being bent out of alignment with the portion of the valve on the upstream side of the pivot so that the bent portion of the valve projects farther out into the moving stream passing through the valve than the other end of the valve when the valve is being opened, the horizontal projection of the deformed portion of the valve on the downstream side of the pivot being wider than the horizontal projection of the other portion of the valve on the upstream side of the pivot, the effective areas on opposite sides of the valve pivot being substantially equal when the valve is closed so that the valve is substantially balanced when closed, whereby as the opening of the valve is started, the valve becomes unbalanced, so that the flow of the water assists the thermostat in opening it.

3. A valve device comprising a casing, a valve eccentrically pivotally mounted in the casing so as to be in a substantially balanced condition when closed, a thermostat connected with said valve to start its opening movement under predetermined conditions, and means for causing the downstream end of said valve to project outwardly to a point nearer the wall of the casing than the upstream end thereof, after the valve has started its opening movement, the horizontal projection of the deformed portion of the valve on the downstream side of the pivot being wider than the horizontal projection of the other portion of the valve on the upstream side of the pivot, the effective areas on opposite sides of the valve pivot being substantially equal when the valve is closed so that the valve is substantially balanced when closed, whereby the liquid pressure on the downstream end exceeds that on the upstream end, so as to act to move the valve to its open position.

4. A valve device comprising a casing, a valve eccentrically pivotally mounted in said casing and extending at an angle thereacross, the horizontal projection of the portion of the valve on the downstream side of the pivot being wider than the horizontal projection of the portion of the valve on the upstream side of the pivot, the portion of the valve on the upstream side of the pivot moving farther away from the casing than the portion of the valve on the downstream side of the pivot as the valve is opened, the effective areas on opposite sides of the valve pivot being substantially equal when the valve is closed so that the valve is substantially balanced when closed.

5. A valve device comprising a casing through which liquid flows, a valve eccentrically pivotally mounted in said casing, a thermostat connected with said valve to start the opening movement of the valve under predetermined conditions, the horizontal projection of the portion of the valve on the downstream side of the pivot being wider than the horizontal projection of the portion of the valve on the upstream side of the pivot and being provided with a cup-shaped deformation which receives the liquid flowing through the casing as the valve is opened, and which acts to assist in opening the valve, the effective areas on opposite sides of the valve pivot being substantially equal when the valve is closed so that the valve is substantially balanced when closed.

6. A valve device comprising a casing through which liquid flows, a valve eccentrically pivotally mounted in said casing, a thermostat connected with said valve to start the opening movement of the valve under predetermined conditions, and means for increasing the pressure effect of the liquid on the upstream face of the downstream portion of the valve as the valve is opened over that on the upstream face of the upstream portion of the valve to assist in opening the valve after the opening movement is started, consisting in having the downstream portion of the valve bent out of alignment with the upstream portion of the valve so that the bent downstream portion projects farther out into the moving stream passing through the valve than the upstream portion of the valve when the valve is being opened, the effective areas on opposite sides of the valve pivot being substantially equal when the valve is closed so that the valve is substantially balanced when closed.

7. A valve device comprising a casing through which liquid flows, a valve extending across the casing, a pivot connecting the valve with the casing, the valve being eccentrically mounted in the casing, and means for substantially balancing the valve when in its closed position, said means acting on the liquid flowing through the casing as the valve is opened, to produce an unbalanced effect tending to assist in opening the valve.

8. A valve device comprising a casing through which liquid flows, a valve extending diagonally across the casing when in its closed position, said valve having its downstream end deformed and bent out of alignment with the upstream end of the valve, said valve being eccentrically mounted, the horizontal projection of the downstream portion of the valve being wider than the horizontal projection of the upstream portion of the valve, the effective areas on opposite sides of the valve pivot being substantially equal when the valve is closed so that the valve is substantially balanced when closed and becomes unbalanced after the opening movement is started.

CLYDE A. BROWN.